United States Patent
Bellotti et al.

(10) Patent No.: US 6,520,304 B2
(45) Date of Patent: Feb. 18, 2003

(54) MOVEMENT TRANSMISSION DEVICE FOR MOTOR VEHICLE FANS WITH COAXIAL OPERATION OF THE COUPLING SYSTEM

(75) Inventors: Claudio Bellotti, Cerro Al Lambro (IT); Erminio Depoli, Crema (IT); Fabio Natale, S. Donato Mil.Se (IT)

(73) Assignee: Baruffaldi S.p.A., San Donato Milanese (IT)

(*) Notice: Subject to any disclaimer, the term of this patent is extended or adjusted under 35 U.S.C. 154(b) by 0 days.

(21) Appl. No.: 09/791,975

(22) Filed: Feb. 23, 2001

(65) Prior Publication Data
US 2001/0017249 A1 Aug. 30, 2001

(30) Foreign Application Priority Data
Feb. 29, 2000 (IT) .......................... MI00A0382

(51) Int. Cl.[7] ................................ F16D 47/00
(52) U.S. Cl. .................. 192/48.2; 192/48.5; 192/84.31; 192/91 A
(58) Field of Search .............. 192/48.2, 48.4, 192/48.5, 84.31, 84.961, 82 T, 91 A; 310/78, 100, 105

(56) References Cited

U.S. PATENT DOCUMENTS

| | | | | |
|---|---|---|---|---|
| 4,926,992 A | * | 5/1990 | Linnig | 192/48.2 |
| 5,586,636 A | * | 12/1996 | Linnig | 192/48.2 |
| 5,611,415 A | * | 3/1997 | Davis et al. | 192/48.4 |
| 5,636,719 A | * | 6/1997 | Davis et al. | 192/48.2 X |
| 5,994,810 A | * | 11/1999 | Davis et al. | 310/105 |
| 6,013,003 A | * | 1/2000 | Boffelli et al. | 192/84.21 X |

FOREIGN PATENT DOCUMENTS

| | | |
|---|---|---|
| DE | 32 03 143 C2 | 8/1983 |
| EP | 0 317 703 B1 | 5/1989 |

* cited by examiner

Primary Examiner—Richard M. Lorence
(74) Attorney, Agent, or Firm—Herbert Dubno

(57) ABSTRACT

A device for transmitting movement to a fan for cooling the coolant in a motor vehicle has a shaft on which the fan is mounted by means of an idle support, and a first electromagnetic clutch, engagement of which causes rotation of the fan at a speed equal to that of the shaft. A second clutch causes rotation of the fan at a speed lower than that of the shaft or at zero speed. The second clutch has an actuator coaxially displaceable, in both directions, with respect to the shaft, but idle upon rotation of the latter. A coupling which is coaxially locked in rotation with the shaft is connected to the actuator and is suitable for engagement with the rotor of the second clutch.

19 Claims, 4 Drawing Sheets

MOVEMENT TRANSMISSION DEVICE FOR MOTOR VEHICLE FANS WITH COAXIAL OPERATION OF THE COUPLING SYSTEM

FIELD OF THE INVENTION

The present invention relates to a device for transmitting the movement to a fan for cooling the coolant in a motor vehicle, comprising a first electromagnetic clutch, a second clutch and means for engaging/disengaging the second clutch, comprising an actuating element coaxially displaceable, in both directions, with respect to the movement generating means, but idle upon rotation thereof.

BACKGROUND OF THE INVENTION

It is known in the technical sector relating to the cooling of coolants contained in motor-vehicle radiators that there is a need to force air onto the radiator in order to obtain more rapid dissipation of heat from the coolant to the exterior, the forced air flow being obtained by causing rotation of a fan which is normally mounted either directly on the crankshaft or on the water pump shaft or on a driven and fixed shaft carrying a pulley which receives movement from a belt actuated by the crankshaft.

It is also known that said fan must be made to rotate only upon reaching a certain predefined temperature of the water detected by means of a thermostat which activates an electromagnetic clutch, closing of which causes the fan to start rotating.

Said electromagnetic clutches cause the fan to start rotating at the speed of rotation of the actuating pulley, without the possibility of causing a variation in the speed of rotation of the fan depending on the variation in speed of actuation thereof.

More particularly it is required that a motor vehicle fan must be able to rotate:

at a lower speed than that of the transmission shaft for cooling in low external temperature conditions;

at a speed equal to or even greater than that of the transmission shaft in the case of higher external temperatures or use in severe conditions which cause overheating of the engine;

at zero speed, namely with the fan which does not rotate at all and remains in an idle condition with respect to the transmission shaft, in the case of particularly low temperatures at which further cooling is of no use or even damaging.

In an attempt to achieve these performance features, coupling systems of the mixed type with electromagnetically operated friction clutches and drive couplings based on the use of parasitic currents generated by rotation of a conducting element in the vicinity of permanent magnets have been developed.

This solution is, for example, known from DE 3 203 143 which describes an arrangement in which the crankshaft is connected to the rotor of an electromagnetic clutch, engaged by an armature connected to the fan for direct driving, whereas low speed conditions make use of the engagement between a conducting disk, rotating with the transmission shaft, and the permanent magnets integral with the fan, said engagement causing transmission of movement at a low speed as a result of relative slipping between the two parts.

With this solution, however, it is not possible to obtain the idle condition of the fan.

In order to overcome this drawback, EP 0 317 703 described a coupling which, adopting the solution disclosed by the preceding patent DE 3 203 143, also envisages a second electromagnetic clutch which, in combination with the others, is able to achieve the three different operating conditions, but requires the manufacture of a special bearing, which is not standard and is expensive and difficult to produce.

Both the solutions also have a structural limitation consisting in the fact that the slow speed is predetermined by the size of the permanent magnets necessary for operation of the clutch and it is therefore not possible to regulate the slow speed of rotation of the fan within a variable range corresponding to the actual temperature conditions of the engine.

In addition to this, the particular configuration of the engine compartments of motor vehicles for which said devices are intended requires, in particular in the case of a fan supported by a fixed shaft carrying the actuating pulley, the positioning of large projecting rotational masses at a considerable distance from the point of attachment of the fixed shaft supporting the fan, with obvious drawbacks resulting in the need, among other things, for brackets and fixtures for the whole assembly; this gives rise to a further increase in the dimensions, technical difficulties in configuration of the parts—due to the presence in the engine compartment of other engine parts—and a consequent overall increase in the manufacturing costs.

OBJECTS OF THE INVENTION

An object of the invention is to provide device for transmitting the rotational movement to a fan for cooling the coolant of motor vehicles, which is actuated by a single actuating means and allows the fan to rotate at a controllable number of revolutions adjustable depending on the actual cooling requirement of the engine, which also includes the possibility of keeping the fan stationary in the case of very low external temperatures.

Another object is to provide a device which has compact dimensions without high and costly projecting rotational masses and should be controlled by means of direct detection of the temperature of the coolant.

SUMMARY OF THE INVENTION

These objects are achieved according to the present invention by a device for transmitting the movement to a fan cooling the coolant of a motor vehicle, comprising movement generating means on which the fan is mounted by means of an idle support, a first electromagnetic clutch, engagement of which causes rotation of the fan at a number of revolutions equal to that of the movement generating means; a second clutch, engagement/disengagement of which causes rotation of the fan at a number of revolutions lower than that of the movement generating means or at zero revolutions; means for engaging/disengaging the second clutch comprising an actuating element coaxially displaceable, in both directions, with respect to the movement generating means, but idle upon rotation of the latter; and engaging means which are coaxially locked in rotation with the movement generating means and connected to said displacement actuating element and suitable for engagement/disengagement with the rotor of the said second clutch.

BRIEF DESCRIPTION OF THE DRAWING

Further details may be obtained from the following description of a non-limiting example of embodiment of the invention, provided with reference to the accompanying drawings in which.

SPECIFIC DESCRIPTION

Figure 1A:
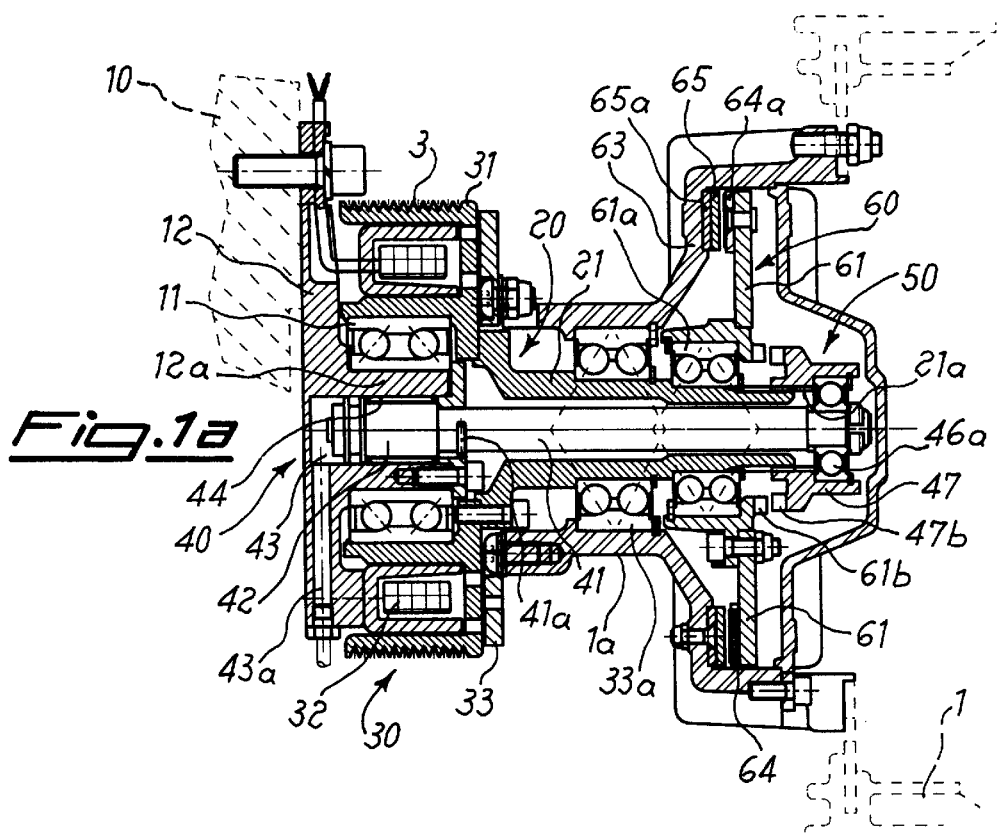
FIGS. 1a and 1b show a schematic axial section through the device for transmitting the movement to the fan according to the invention with an induction clutch and toothed coupling, in the open and closed position, respectively.
Figure 1B:
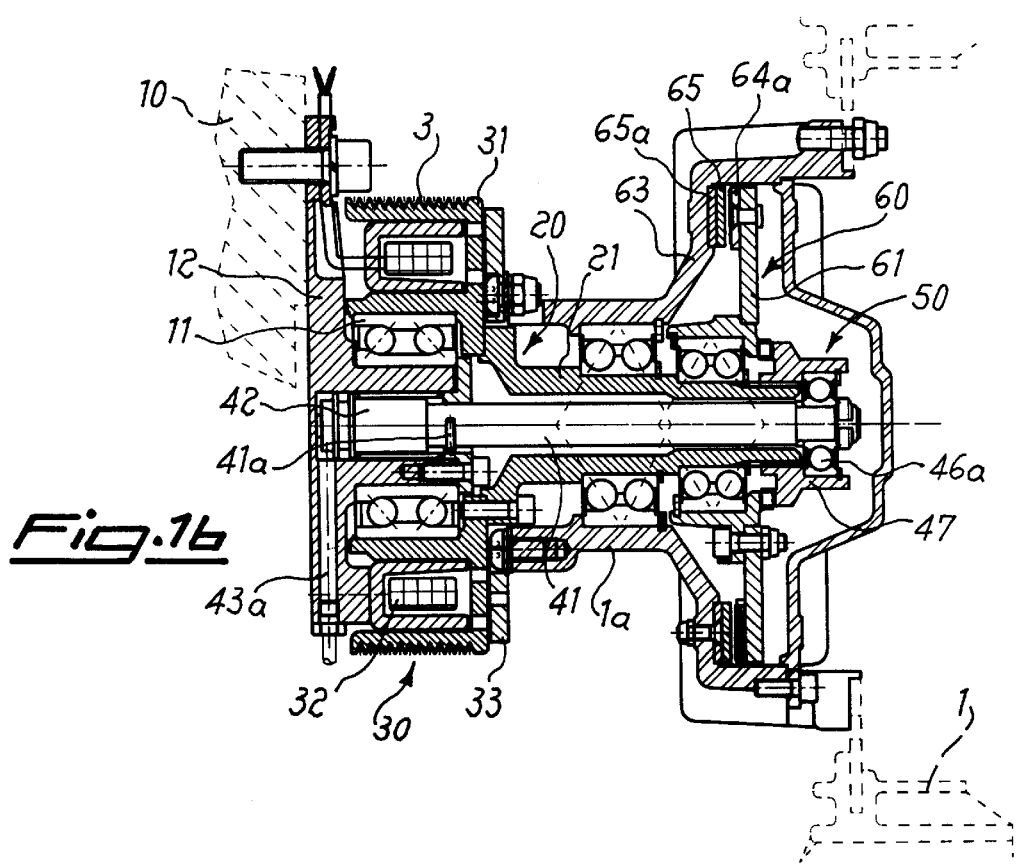

As shown in FIGS. 1a, 1b, the device for transmitting the movement to a motor-vehicle cooling fan 1 is arranged between the fan 1 itself and an actuating shaft 20 integral with a pulley 3 connected to the crankshaft by means of a belt (not shown). For convenience the "longitudinal direction" will be understood as being a direction parallel to the longitudinal axis of the actuating shaft 20.

In greater detail the actuating shaft consists of a hollow sleeve 21, one end of which is connected to a rotor 31 integral with the pulley 3 and mounted on a bearing 11 keyed onto a suitable hollow extension 12a of a support flange 12 integral with the base 10 of the engine.

The rotor 31 forms the rotating element of an electromagnet clutch 30 formed by an annular electromagnet 32 concentric with the rotor and arranged between the latter and the fixed flange 12 and electrically connected to a thermostat (not shown), for example, for the cooling-water temperature.

The armature 33 of the clutch 30 is arranged on the opposite side to the electromagnet 32 with respect to the rotor 31, being connected to a bell 1a which supports the fan 1 and which is mounted on a bearing 33a in turn keyed onto the hollow sleeve 21.

The hollow sleeve 21 has, coaxially arranged inside it, the rod 41 of a device 40 for actuating in the longitudinal direction a coupling 50 of a second clutch 60, the rotor 61 of which is mounted on a bearing 61a keyed onto the sleeve 21 and the armature 63 of which consists of a suitable portion of the bell 1a supporting the fan 1.

Said second clutch is of the induction type based on parasitic or Foucault currents and comprises a plurality of permanent magnets 64 which are supported by a retaining ring 64a made of non-magnetic material and integral with the rotor 61 and a first ring 65 made of conductive material and supported by a second ring 65a mounted on a non-magnetic support consisting of the said part 63 of the bell 1a.

In this way the rotor 61 and the magnets 64 form the induction linkage elements able to cause rotation of the bell 1a and therefore the fan 1.

The said coupling device 40 of the second clutch 60 consists of said rod 41, one end of which is rigidly joined to a piston 42 sliding inside a cylinder 43 to which the actuating fluid is supplied by means of an associated duct 43a which causes the forwards movement of the rod 41 longitudinally and outwards against the thrusting action of a spring 44 which tends to cause the rod 41 to return into the retracted position.

Said cylinder may be conveniently of the pneumatic/hydraulic/oil-hydraulic type.

Alternatively, actuation of the coupling may also be of the electromechanical type.

Said rod is prevented from rotating by means of a radial stop element 41a integral with the fixed flange 11.

At the free end of the rod, opposite to that of the piston 42, a bearing 46a which supports a crown wheel 47 axially sliding on a guide 21a of the sleeve 21 and integrally movable in rotation with the latter is mounted. The longitudinal teeth 47b of the wheel 47 are designed to mesh with corresponding and opposite front teeth 61b of the rotor 61.

The operating principle of the coupling is as follows:

the cylinder 43 is kept normally supplied under pressure so as to overcome the resistance of the spring 44 and bring the rod 41 into the extended position for uncoupling the coupling 47,47b from the rotor 61,61b which thus remains stationary;

if the electromagnet 32 is kept deactivated, the armature 33 of the clutch remains separated from the rotor 31 and the fan 1 remains in an idle condition with respect to the movement generating sleeve 21;

if the electromagnet 32 is activated, the armature 33 is recalled so as to make contact with the rotor 31, together with which it starts to rotate, causing the rotation of the bell 1a, and therefore the fan 1, at a number of rotations equal to that of the actuating shaft;

if the electromagnet 32 is kept deactivated and the cylinder 43 is discharged, the thrusting action of the spring causes the recall, inwards, of the rod 41 which axially displaces the coupling 50, causing meshing of the front teeth 47b and 67b and therefore rotation of the rotor 61 of the second clutch 60; said rotation causes the formation of parasitic currents between the elements 64 and 65 of the clutch 60 which cause rotation of the bell 1a and therefore the fan 1.

Since driving of the bell by the rotor 61 occurs with a relative slippage, the fan will rotate at a speed lower than that of the shaft 21.

It can therefore be understood how the transmission device according to the invention is able to ensure the three required speeds of rotation of the fan (number of revolutions equal to or less than those of the movement generating shaft or zero revolutions) without large rotating loads projecting from the fixed support and with control produced by direct detection of the water temperature.

In addition to this, the longitudinal movement of the rod 41 between two mechanically defined end-of-travel stops ensures substantial elimination of the possibility of error by the coupling of the second clutch; moreover, the fact that engagement of the second clutch is determined by the thrusting action of the spring 44 ensures that rotation of the fan, and therefore cooling of the engine, is ensured also in the event of malfunctions which prevent correct actuation of the first and second clutch by the various control circuits.

Figure 2B:
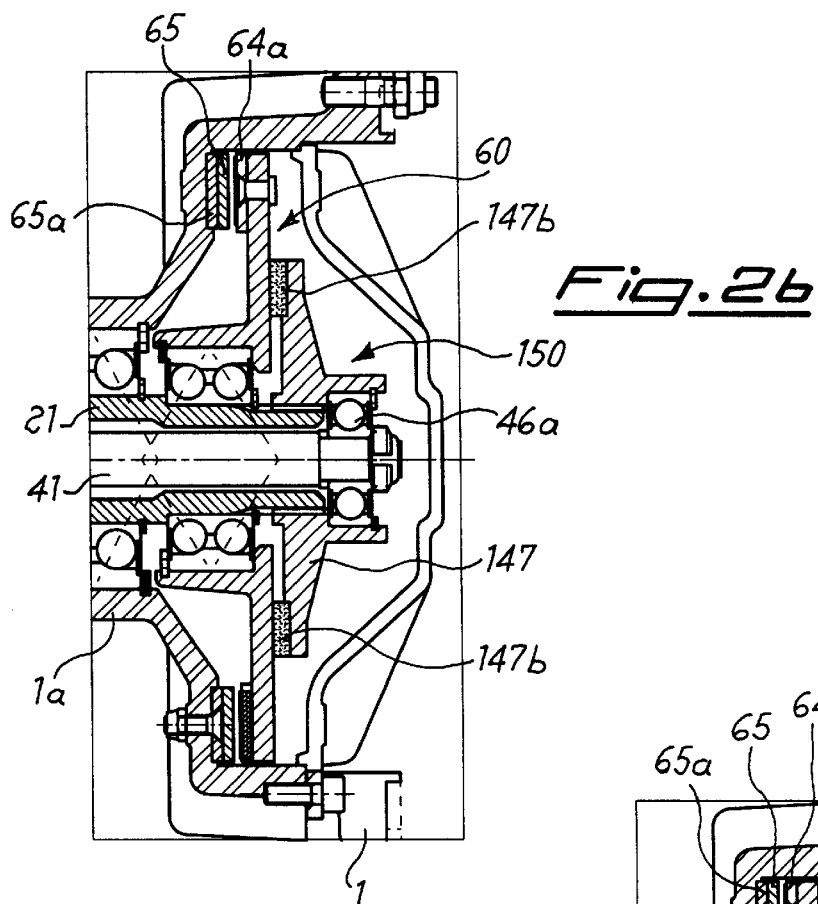
FIGS. 2a and 2b show a schematic axial section through the device for transmitting the movement to the fan according to the present invention with an induction clutch and friction-element coupling, in the open position and closed position, respectively.
Figure 2A:
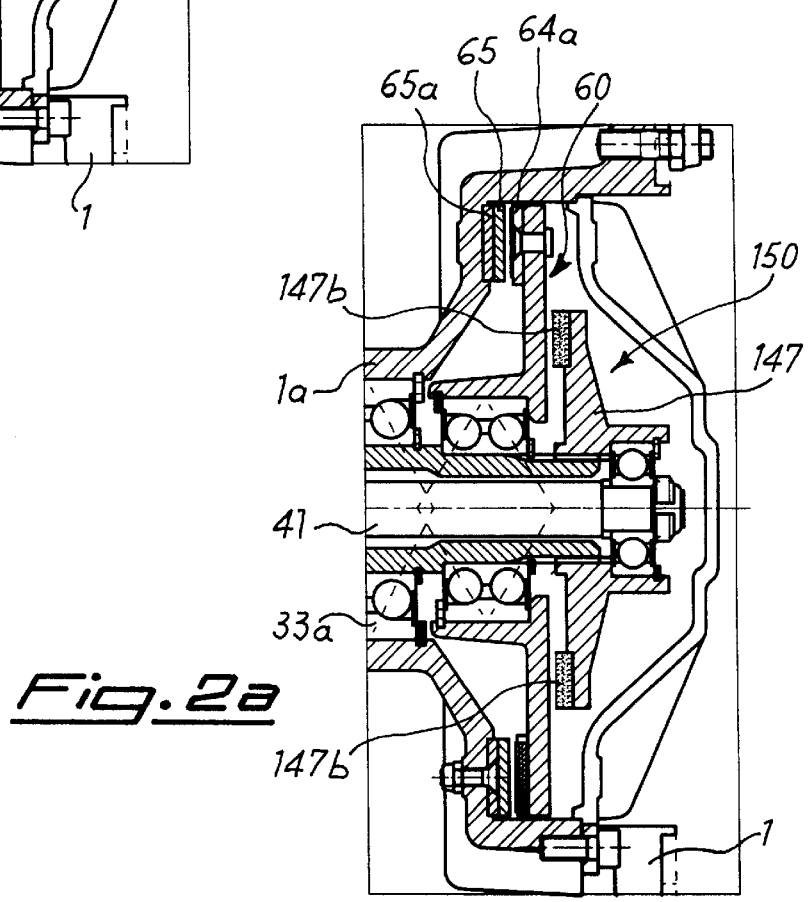

FIGS. 2a and 2b show a variation in which the coupling 150 of the second clutch 60 is formed by elements 147b with a high coefficient of friction arranged on the wheel 147 integral with the rod 41; in this configuration the production of the device is further simplified.

Figure 3A:
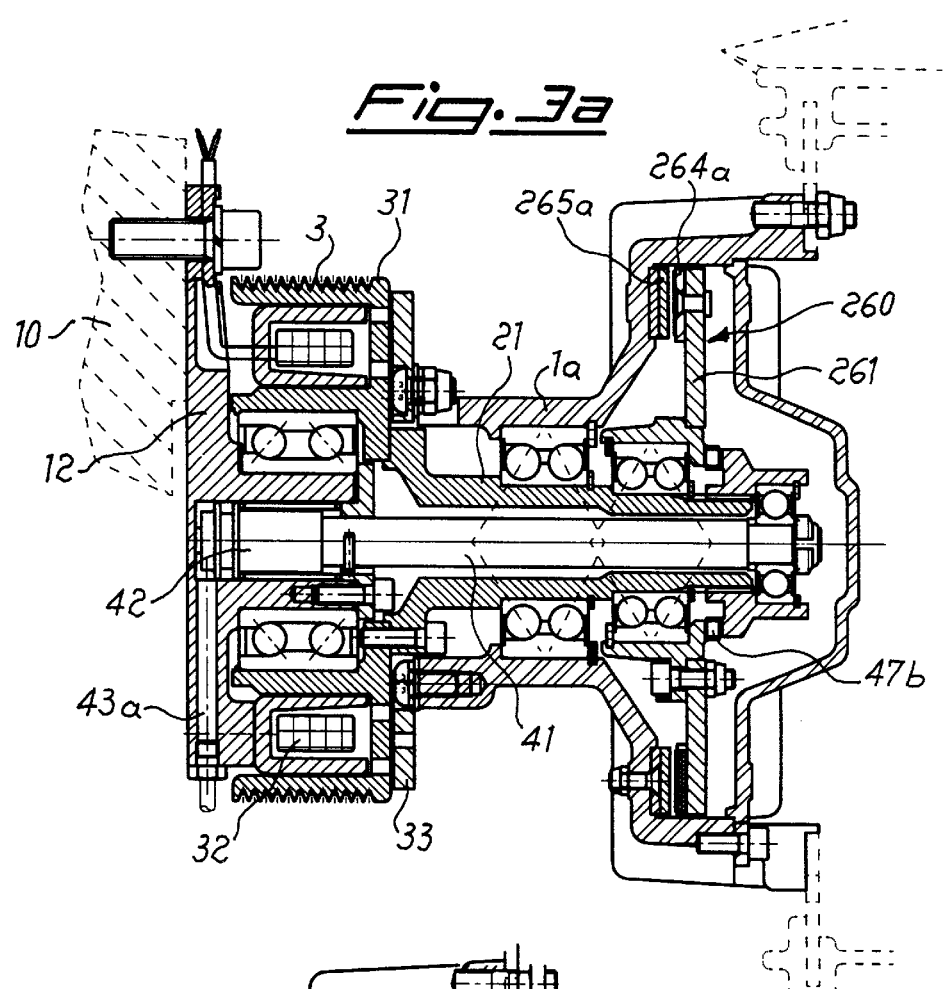
FIGS. 3a and 3b show a schematic axial section through the movement transmission device with a magnetic-hysteresis clutch and toothed and friction coupling, respectively.
Figure 3B:
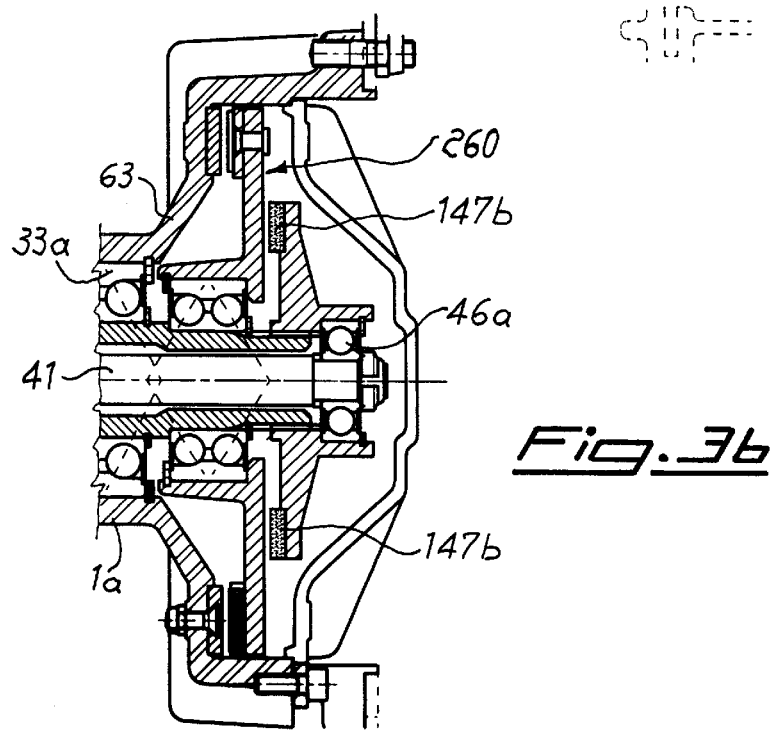

FIGS. 3a to 3b show devices similar to those described in relation to FIGS. 1a and 2a in which the second clutch 260 is of the magnetic hysteresis type instead of the induction type.

In this case, the permanent magnets 264a supported by a ring are arranged on the rotor 261, while a ring 265a made of magnetically semi-hard material is joined to the bell 1a.

Engagement of the second clutch 260 may again be performed by the same toothed coupling 47b or friction coupling 147b already described in connection with the induction clutch 60,160.

Both in the case of a second induction clutch and in the case of a second hysteresis clutch it is envisaged that the associated rotor is able to position linkage elements so that they are arranged facing the opposite sides of the rotor in order to balance the axial thrusts which are generated on the bearing, producing at the same time an increase in the driving torque.

Figure 4A:
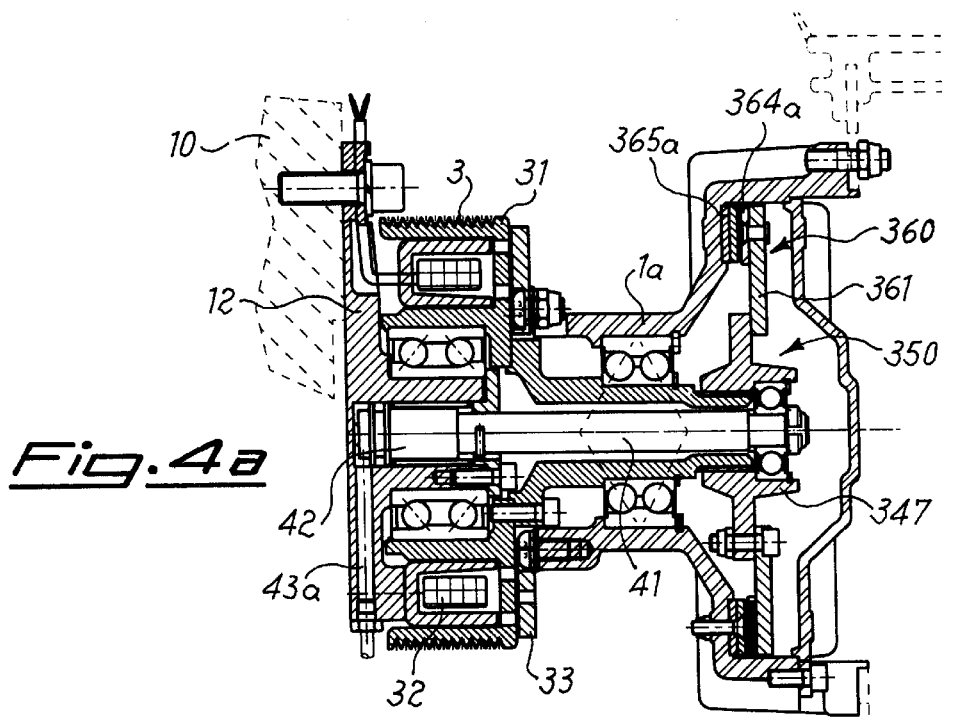
FIGS. 4a and 4b show a schematic axial section through the device for transmitting the movement to the fan according to the present invention with an induction clutch and clutch air-gap control coupling, in the engaged and disengaged position, respectively.
Figure 4B:
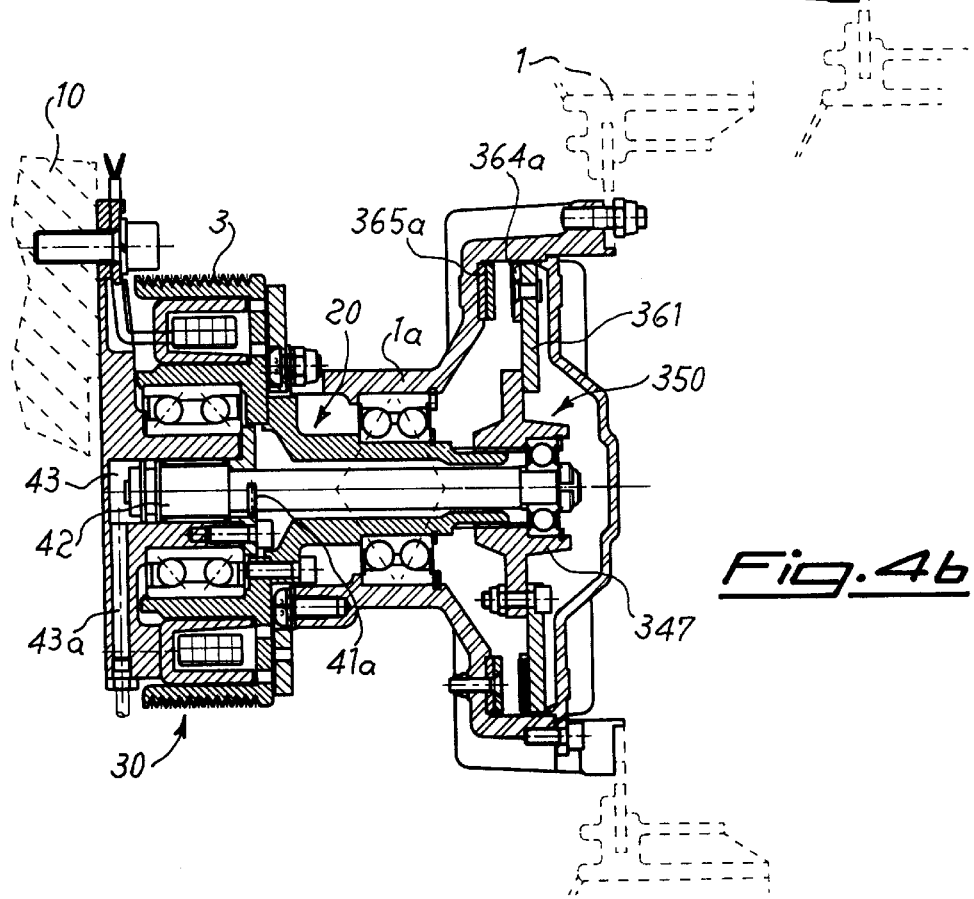

FIGS. 4a and 4b, finally, show a further embodiment of the device according to the invention in which engagement of the second clutch 360 is obtained by controlling the size of the air-gap, i.e. the distance between the elements 364a and 365a which produce linkage between the rotor 361 and support bell 1a of the fan 1.

In greater detail the coupling 350 is formed by an annular flange 347 rigidly joined to the rod 41 in a manner entirely similar to that already described in relation to FIG. 1a.

In this case, however, the flange 347 is stably joined to the rotor 361 of the second clutch 360 so that actuation of the rod 41 in the longitudinal direction produces:

in one direction: movement of the rotor and hence the conducting elements 364a towards the corresponding conducting elements 365a of the bell 1a, thereby producing linkage and rotational driving of the fan 1;

in the other direction: movement of the rotor 361 away from the bell 1a and therefore an increase of the air-gap between the conducting elements 364a,365a such as to neutralize substantially the formation of parasitic linkage currents and therefore rotational driving of the bell 1a which remains stationary in the idle condition together with the fan 1.

With this coupling configuration, which may be realized both for induction clutches and magnetic hysteresis clutches, it is also possible to achieve substantially continuous control of the speed of rotation of the fan since, by suitably adjusting displacement of the rod 41, the size of the air-gap is correspondingly adjusted, resulting in greater/lesser relative linkage and therefore a greater/smaller transmitted torque corresponding to an adjustment in the revolutions of the fan.

In greater detail, it is envisaged that said adjustment of the distance is performed by corresponding means for adjusting the pressure of the fluid in the cylinder, or by a double-acting cylinder, or by means of the electromechanical type able to produce different equilibrium positions with respect to the spring 44.

What is claimed is:

1. A device for transmitting movement to a fan for cooling a coolant in a motor vehicle, comprising:

movement generating means on which the fan is mounted by means of an idle support;

a first electromagnetic clutch, engagement of which causes rotation of the fan at a speed equal to that of the movement generating means;

a second clutch, engagement and disengagement of which causes rotation of the fan at a speed less than that of the movement generating means or at zero speed, said second clutch having a rotor;

means for engaging and disengaging the second clutch and including an actuating element coaxially displaceable in two opposite directions with respect to the movement generating means, but idle upon rotation of the movement generating means; and coupling elements which are coaxially locked in rotation with the movement generating means and connected to said displacement actuating element, said coupling elements enabling engagement and disengagement with the rotor of the said second clutch.

2. The device according to claim 1 wherein said first clutch is supported in a position substantially adjacent to a casing of an engine of the vehicle.

3. The device according to claim 1 wherein said first clutch comprises an electromagnet coaxially mounted inside the rotor integral with a movement generating pulley.

4. The device according to claim 1 wherein said second clutch is coaxially supported in a position substantially projecting from a base of an engine of the vehicle.

5. The device according to claim 1 wherein said actuating element consists of a rod coaxially arranged inside the movement generating means.

6. The device according to claim 1 wherein said actuating element is associated with corresponding displacement actuators.

7. The device according to claim 6 wherein said displacement actuators consist of a piston moved by a cylinder against a thrusting action of a return spring.

8. The device according to claim 7 wherein said cylinder is of a pneumatic/hydraulic/oil-hydraulic type.

9. The device according to claim 6 wherein said actuators are of an electromechanical/electromagnetic type.

10. The device according to claim 1 wherein said actuating element has at a free end thereof a bearing on which said coupling elements are mounted.

11. The device according to claim 1 wherein said coupling elements include a crown wheel with front teeth.

12. The device according to claim 11 wherein the rotor of the second clutch has front teeth suitable for meshing with the teeth of the wheel.

13. The device according to claim 1 wherein said coupling elements include a disk supporting elements with a high coefficient of friction suitable for direct engagement with a surface of the rotor of the second clutch.

14. The device according to claim 1 wherein said coupling elements include an annular flange which is joined to the rotor of the second clutch.

15. The device according to claim 1 wherein said second clutch is a parasitic-current clutch.

16. The device according to claim 1 wherein said second clutch is a magnetic-hysteresis clutch.

17. The device according to claim 1 wherein said second clutch is an engaging/disengaging clutch.

18. The device according to claim 14 wherein said second clutch comprises means for controlling the distance of the rotor from a fan support bell, able to control the amount of the air-gap distance between conducting elements and magnetic elements from a maximum driving-torque engaged position to a zero driving-torque disengaged position.

19. The device according to claim 18 wherein said means for controlling and adjusting the air-gap distance are designed to ensure substantially continuous adjustment of the driving torque between the maximum engaged position and zero disengaged position.

* * * * *